March 2, 1965  W. C. KYLE  3,171,319
LAMINATED DIE AND METHOD OF FORMING THEREOF
Filed Aug. 25, 1961  2 Sheets-Sheet 1

INVENTOR.
William C. Kyle
BY
A. F. Baillio
ATTORNEY

March 2, 1965  W. C. KYLE  3,171,319
LAMINATED DIE AND METHOD OF FORMING THEREOF
Filed Aug. 25, 1961  2 Sheets-Sheet 2

INVENTOR.
William C. Kyle
BY
A. F. Baillio
ATTORNEY

United States Patent Office 3,171,319
Patented Mar. 2, 1965

3,171,319
LAMINATED DIE AND METHOD OF FORMING THEREOF
William C. Kyle, Wayne, Mich., assignor to General Motors Corporation, Detroit, Mich., a corporation of Delaware
Filed Aug. 25, 1961, Ser. No. 134,024
7 Claims. (Cl. 83—690)

This invention relates to a laminated die and more particularly to a blanking die of novel laminate construction.

In general, the use of laminated dies is a known expedient in the die making art. Most often, conventional laminated dies comprise a series of vertically stacked plates in which a die cavity is machined or otherwise formed. Laminated dies formed of horizontally stacked plates have also been previously used in metal forming operations where a sheet of material is bent into a simple curved form. The present invention is directed to the use of a laminated die in a blanking operation wherein articles of a particular configuration are blanked, or punched out, of sheet stock by a male member, or punch, which is movable into and out of a female member, or die cavity. In a blanking operation, movement of the punch into the die cavity shears a portion of sheet stock placed therebetween into a configuration matching that of the die cavity and punch. The punch and the die cavity are similarly configured and the dimensions of the punch relative to the die cavity are substantially identical.

Many blanking operations are limited in scope and are utilized for low volume production. In such operations, it is desirable to use a minimum amount of labor and material in the construction of the dies. Since the dies are to be used for short periods of time and for low volume production, accuracies required in other types of blanking operations are not essential. An object of the present invention is to provide a new and improved low cost blanking die. Another object of the present invention is to provide a method of forming a blanking die in a minimum amount of time and at a minimum cost. Still another object of the present invention is to provide a blanking die in which a die cavity can be formed without any machining operations. An additional object of the present invention is to provide a blanking die in which the outline of the die cavity is exactly determined by the outline of the punch to be associated therewith. Other objects and advantages of the present invention will be apparent to those skilled in the art by reference to the following detailed description wherein reference is made to the accompanying drawings in which:

Figure 1:
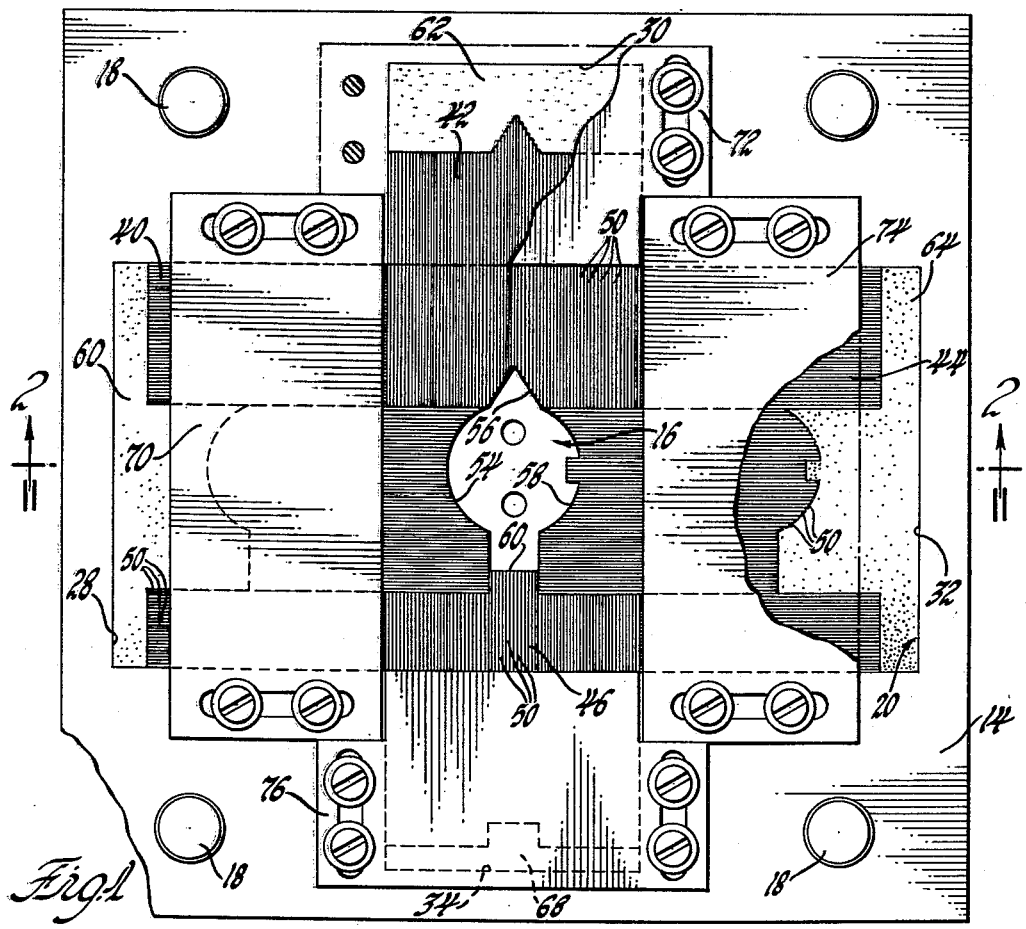
FIGURE 1 is a plan view, partly in section, of apparatus embodying the principles of the present invention.
Figure 2:
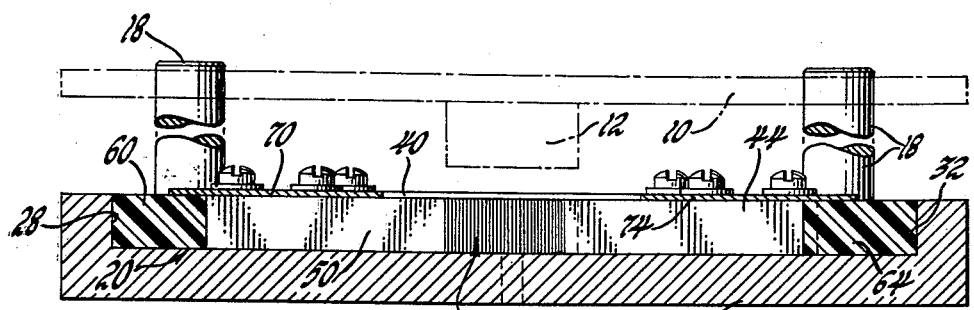
FIGURE 2 is a sectional view taken along the line 2—2 in FIGURE 1.

Referring now to FIGURES 1 and 2, a punch and die set for a blanking operation is illustrated and comprises, in general, a punch plate 10 to which a punch 12 is secured and a die plate 14 in which a die cavity 16, corresponding to the punch 12, is formed. As is conventional, guide rods 18 are provided to guide the punch plate 10 and locate the punch 12 within the cavity 16.

The die plate 14 is provided with a central cavity 20 which has a cruciform outline defining a plurality of pockets 28, 30, 32, 34 which are spaced from one another at 90 degrees around the central cavity 20. A plurality of shim banks 40, 42, 44, 46 are slidably supported for forward and rearward movement in each of the pockets 28, 30, 32, 34. The shim banks comprise horizontally stacked individual rectangular shim elements 50 having parallel vertically extending side surfaces in the form of a rectangle and having relatively thin edge portions for a purpose to be hereinafter described. The actual thickness of the "relatively thin" edge portions is a function of the size of the part to be blanked and the dimensional accuracy required. The preferred shim thickness for the illustrative embodiment is on the order of 0.01 inch. In any event, each of the individual shims 50 have relatively thin edge portions. The inwardmost edges 54, 56, 58, 60 of the shims of each of the shim banks form the peripheral surfaces of the die cavity 16. Thus, the thickness of the edge of the shim determines the dimensional accuracy of curved sections of the part to be formed.

Figure 3:
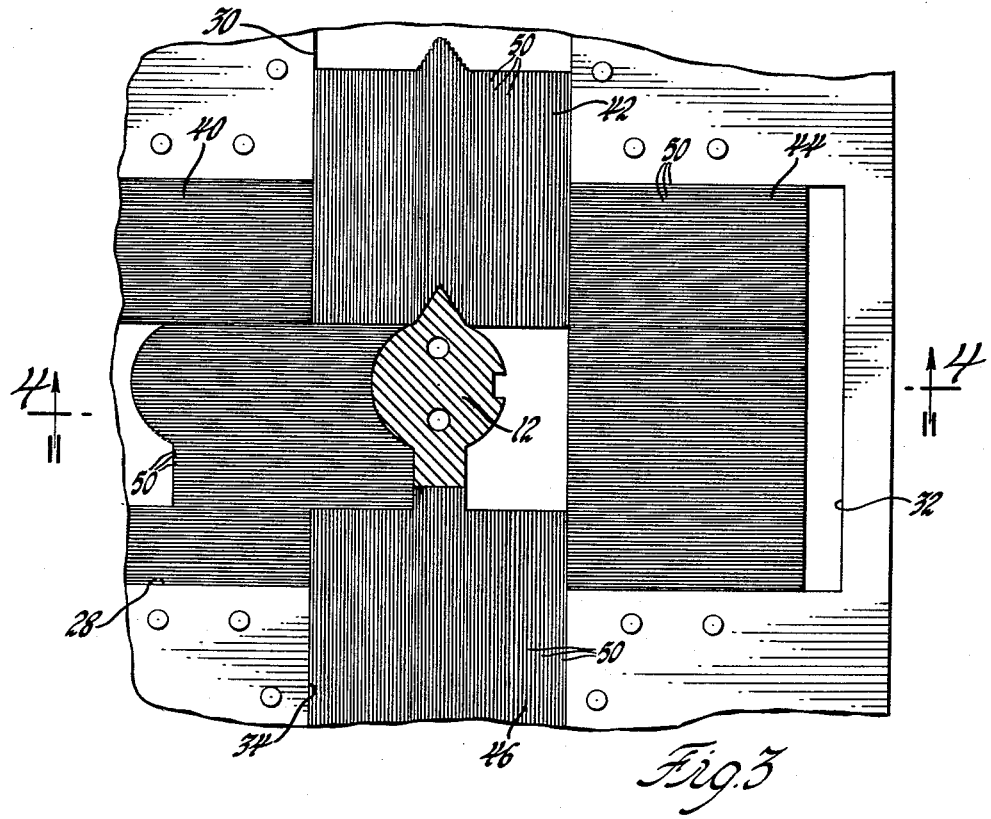
FIGURE 3 is a partial view of the apparatus shown in FIGURE 1 illustrating an intermediate step of the method of manufacture of the apparatus shown in FIGURE 1.
Figure 4:
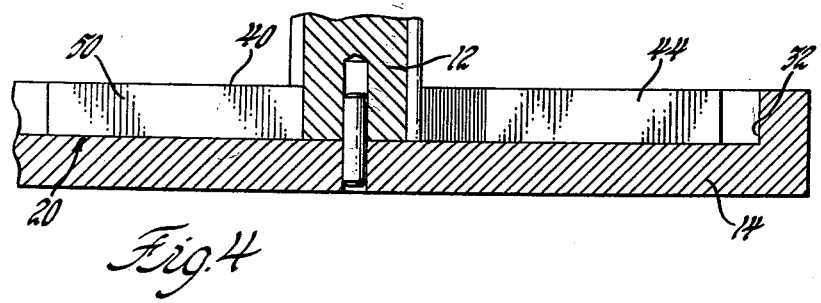
FIGURE 4 is a sectional view taken along the line 4—4 in FIGURE 3.

Referring now to FIGURES 3 and 4, the die cavity 16 is formed by placing the punch 12 in its lowermost position within the central cavity 20. The punch is previously machined to the desired contour of the part to be formed in the blanking operation. The individual shims in each of the shim banks are slidably inwardly displaced until the inner edges thereof abuttingly engage the entire peripheral surface of the punch 12. In FIGURE 3, the shims in the shim banks 40, 42, and 46 have been inwardly displaced into abutting engagement with the punch 12. The shims in the shim bank 44 are illustrated in their original positions within the pocket 32. When the shims in the shim bank 44 are moved inwardly, they will attain the position shown in FIGURE 1. After the shims have been inwardly displaced into abutting engagement with the punch 12, suitable bodies of plastic material 60, 62, 64 and 68 are molded in the pockets 28, 30, 32, 34 around the rearward edges of the individual shims. Shim fastening means comprising plate elements 70, 72, 74, 76 are adjustably secured to the die plate 14 by fastening bolts or the like which extend through elongated slots provided in each of the fastening plates. Thus, when the punch cavity 16 has been formed by inward movement of the shims into peripheral engagement with the punch and the plastic backup material has been poured into the pockets, the plates 70, 72, 74, 76 are securely fastened across the top surfaces of the shims to secure them in place and form a permanent die cavity having an outline substantially identical to the outline of the punch.

It is intended that obvious modifications in the details of construction and the arrangement of the parts, which will be readily apparent to those skilled in the art, are to be included within the scope of the invention as defined by the appended claims, except insofar as restricted by the prior art.

The invention claimed is:

1. In die apparatus for blanking an article from sheet metal by means of a punch and die arrangement: the improvement in the die comprising, a plurality of banks of shim means adapted to form a die cavity similar in outline to said punch, each bank of shim means being positioned at right angles to the next adjacent bank of shim means whereby opposite banks of shim means are aligned with one another in a straight line, each bank of shim means forming a portion of said die cavity and being slidably movable relative to the other banks of shim means into surface engagement with said punch, and means to secure said banks of shim means in abutting engagement with said punch whereby a mating die cavity is formed for said punch.

2. The method of forming a die cavity for a punch having a particular peripheral outline and comprising the steps of: (1) arranging banks of parallel shims around the periphery of said punch; (2) engaging portions of each of said banks of shims with a portion of the periphery of said punch until all the portions of the peripheral surface of said punch are contacted by shims in said banks of shims; (3) and rigidly fastening the shims in said banks of shims in the position of peripheral engagement with said punch to form a die cavity therefor having a similar outline thereto.

3. In die apparatus for use with a punch in blanking articles from sheet metal or the like: a die plate; a central cavity provided on said die plate, said central cavity being cruciform in outline to define four pockets spaced at 90 degree intervals around said cavity; a bank of shims slidably mounted in each of said pockets and extending inwardly toward one another and defining, when all of the shims of each bank are equally inwardly displaced, a rectangular opening; a die cavity formed by inward displacement of the shims of each bank into peripheral engagement with the adjacent peripheral portions of a punch supported within said rectangular opening to form a die cavity having an outline similar to the outline of said punch; backup means to secure said banks of shims in the positions of peripheral engagement with said punch; and fastening means to secure said banks of shims in the positions of peripheral engagement with said punch so that the shims in said banks of shims form a permanent die cavity for said punch.

4. The apparatus as defined in claim 3 and wherein said backup means comprises a plastic filler molded between the outward ends of the shims of said bank of shims and the back wall of said pockets.

5. The apparatus as defined in claim 3 and wherein said banks of shims each comprise individual rectangular steel shims having a relatively small thickness in the order of 0.01 inch, the steel shims in each bank being abuttingly supported against one another on an edge surface thereof whereby the width of surface contact of any shim with said punch is in the order of 0.01 inch.

6. In die apparatus, a punch cavity formed by a plurality of shim banks, said shim banks being composed of individual shims having a relatively narrow width, retaining means to secure each of said shim banks in positions disposed 90 degrees from adjacent shim banks, and each of said individual shims being slidably movable forwardly and rearwardly relative to said punch cavity to form varying punch cavity outline defined by engagement of the forward edges of said individual shims with a punch having the outline desired.

7. Die apparatus comprising a punch cavity formed by a plurality of shim banks, individual shims forming each of said shim banks, said individual shims having rectangular side surfaces and narrow peripheral edges having a thickness in the order of 0.01 inch, each of said shim banks comprising a series of said individual shims supported on one of the peripheral edges thereof and being in side surface engagement with one another in a parallel row, adjacent banks of said shims being disposed at right angles to one another and enclosing said punch cavity, means to slidably position said individual shims inwardly and outwardly relative to said punch cavity to obtain a predetermined punch cavity outline, and means to secure said individual shims in any adjusted position to form a permanent die cavity.

References Cited by the Examiner
UNITED STATES PATENTS

| | | | |
|---|---|---|---|
| 595,274 | 12/97 | Soper | 18—44 X |
| 2,332,360 | 10/43 | Wakefield | 76—107 |
| 2,658,415 | 11/53 | Barowsky | 269—266 |
| 2,912,886 | 11/59 | Smith | 76—101 |
| 2,968,838 | 1/61 | Hicks | 18—44 X |

FOREIGN PATENTS

| | | |
|---|---|---|
| 667,398 | 10/29 | France. |
| 977,309 | 2/54 | France. |
| 767,334 | 1/57 | Great Britain. |

WILLIAM W. DYER, JR., *Primary Examiner.*

ANDREW J. JUHASZ, *Examiner.*